April 28, 1931.  G. W. BEACHER  1,803,227
COUPLING FOR SEWER ROD SECTIONS
Filed Nov. 26, 1929
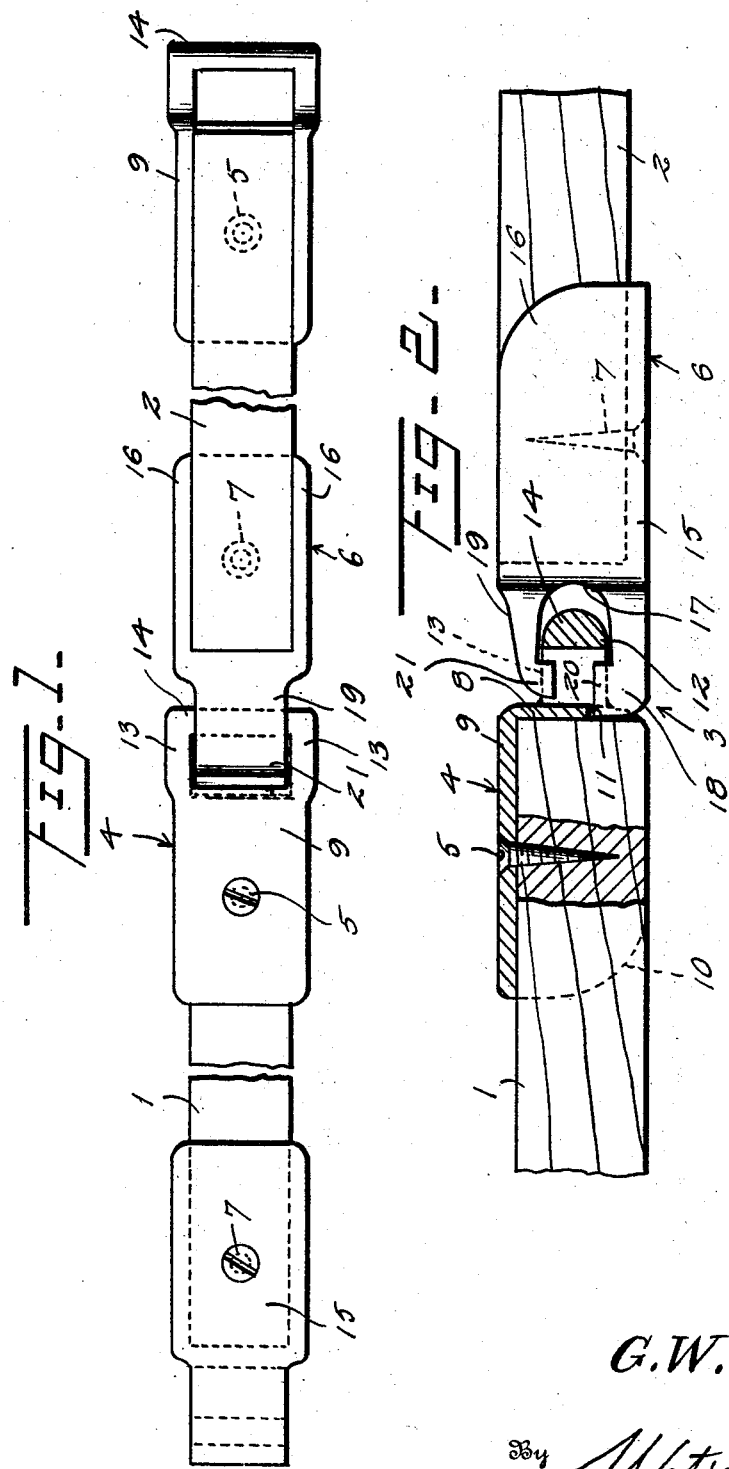
Inventor
G. W. Beacher
By Watson E. Coleman
Attorney Patented Apr. 28, 1931

1,803,227

UNITED STATES PATENT OFFICE

GEORGE W. BEACHER, OF DARBY, PENNSYLVANIA

COUPLING FOR SEWER-ROD SECTIONS

Application filed November 26, 1929. Serial No. 409,935.

This invention relates to sectional rods of that type adapted to be used for the purpose of removing obstructions from sewers, and more particularly to the couplings by which the sections of the rods are connected together.

This invention has for one of its objects to provide a novel, simple and highly efficient coupling embodying members which shall be adapted to be connected or disconnected when the sewer rod sections are angularly related, which shall be adapted to be positively held against separation when the sewer rod sections are in alined position for use, and which shall be adapted to prevent the sewer rod sections from moving while in use into such angular relation as to permit them to become disconnected.

To attain the foregoing and other objects, the nature of which will appear as the description proceeds, the invention comprehends the provision of a coupling of the character stated wherein one member shall be provided with a yoke and a shoulder, wherein the other member shall be provided with rigid jaws embracing the cross bar of the yoke, the cross bar and jaws being of such formation as to permit the members to be connected or disconnected while right angularly related, and one of the jaws contacting with the shoulder to prevent the accidental movement of the members into right angular relation.

The invention is hereinafter more fully described and claimed and illustrated in the accompanying drawing, wherein:—

Figure 1 is a top plan view of two sections of a sewer rod connected together by a coupling constructed in accordance with my invention, and Figure 2 is a view partly in vertical section and partly in side elevation of the coupled ends of the sewer rod sections.

Referring in detail to the drawing, 1 and 2 designate adjacent sections of a sewer rod, and 3 the coupling by which the sections are detachably connected together. The coupling 3 comprises a member 4 which is secured by a screw 5 to the sewer rod section 1, and a member 6 which is secured by a screw 7 to the sewer rod section 2.

The coupling member 4 is in the form of a socket which is of rectangular formation in plan and fully open at its inner end and lower side. The coupling member 4 is provided with an end wall 8 which is formed integrally with its integrally formed top wall 9 and side walls 10 and which terminates short of the lower edges of the side walls to provide a shoulder 11 extending across the front end of the member. The coupling member 4 is provided at its front end with a yoke 12 which extends longitudinally therefrom and consists of side members or arms 13 formed integrally with the walls 8 and 10 and a cross member or bar 14 which is formed integrally with the outer ends of the arms. The cross bar 14 is of substantially semi-circular formation in cross section and arranged with its convex surface outermost and its plane surface innermost, and it extends above and below the shoulder 11.

The coupling member 6 is also in the form of a socket which is rectangular in plan and fully open at its inner end and upper side. The bottom wall 15, side walls 16 and front end wall 17 of this socket member are formed integrally, and the front wall extends from the bottom wall to the upper edges of the side walls. The coupling member 6 is provided at its front end with lower and upper jaws 18 and 19, respectively, which extend longitudinally therefrom and which are formed integrally with the wall 17 and are of angular formation in side elevation. The angular front end 20 of the jaw 18 extends upwardly, and the angular front end 21 of the jaw 19 extends downwardly. The jaw end 20 is wider than the jaw end 21 and extends longitudinally beyond the same. The jaw ends 20 and 21 are spaced apart for a distance greater than the width or horizontal dimension of the cross bar 14 but less than the depth or vertical dimension of the cross bar, so as to permit the jaws 18 and 19 to be engaged with the cross bar by moving the jaws and cross bars in the direction of each other when in right angular relation and by thereafter swinging the coupling members 4 and 6 into alinement. When the coupling members 4 and 6 are in alinement, the jaw ends 20 and 21 are arranged at the inner side of the cross bar 14 and the jaw end 20 is arranged in close contact with the downwardly facing shoulder 11, and due thereto, the coupling members 4 and 6, and consequently the sewer rod sections 1 and 2 are positively held against longitudinal separation and the coupled ends of the sewer rod sections are held against upward swinging movement beyond a slight angle by the shoulder 11 and jaw end 20.

In practice, the rod is pushed into a sewer by an operator standing in a manhole so as to force the débris obstructing the sewer into the next adjacent manhole from which it is removed. The front end of the rod is provided with a spear, not shown, to penetrate the débris, and as it is advanced into the sewer, sections are added thereto. The sections first forced into the sewer and the sections subsequently used may be readily coupled by the operator in the manhole, and after being coupled they will not become detached as they are advanced into the sewer. Each sewer rod section is provided at one end with the coupling member 4 and at the other end with the coupling member 6, and one rod section may be connected to the rod section partly advanced into the sewer by holding the first rod section in an upright position and moving it downwardly and then into a horizontal position to interlock the coupling members.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

A coupling for rod sections, comprising a socketed member provided at its outer end with a shoulder extending across said end, a yoke extending longitudinally from the outer end of said member and embodying a cross bar of greater depth than width, a second socketed member, and jaws extending longitudinally from the outer end of said second member and provided with angular terminals extending from the jaws in the direction of each other and having opposing faces spaced apart for a distance greater than the width of the cross bar and less than the depth thereof, the face of one of the jaw terminals extending longitudinally beyond the other jaw terminal for contact with the shoulder.

In testimony whereof I hereunto affix my signature.

GEORGE W. BEACHER.